Feb. 18, 1936.  W. BARNETT ET AL  2,030,908

DISPENSING APPARATUS

Filed July 7, 1934

INVENTORS
Walter Barnett
Alfred R. O'Key
By their attorney
Harlow M. Davis

Patented Feb. 18, 1936

2,030,908

UNITED STATES PATENT OFFICE 2,030,908

DISPENSING APPARATUS

Walter Barnett and Alfred Richard O'Key, Leicester, England, assignors to United Shoe Machinery Corporation, Paterson, N. J., a corporation of New Jersey Application July 7, 1934, Serial No. 734,150
In Great Britain August 17, 1933

8 Claims. (Cl. 91—66)

This invention relates to apparatus for dispensing liquids and is herein illustrated as embodied in an apparatus of the type in which the supply of material may be stirred or agitated before being dispensed.

In the manufacture of shoes, it is customary to color the shoe bottoms and/or the edges of the soles or heels by means of inks and stains. These materials usually are so compounded that they contain considerable quantities of finely divided solid matter and must be stirred frequently if the desired consistency is to be maintained. For this reason and because of loss by evaporation, it is desirable that only small quantities of the material shall be taken by the user at a time. The handling of small quantities at a time also prevents possible spoilage by dust and the like. One important object of the invention is to provide an improved dispensing apparatus, easy to clean and in which the material in the supply container may be thoroughly stirred just before a small quantity is withdrawn.

Figure 1:
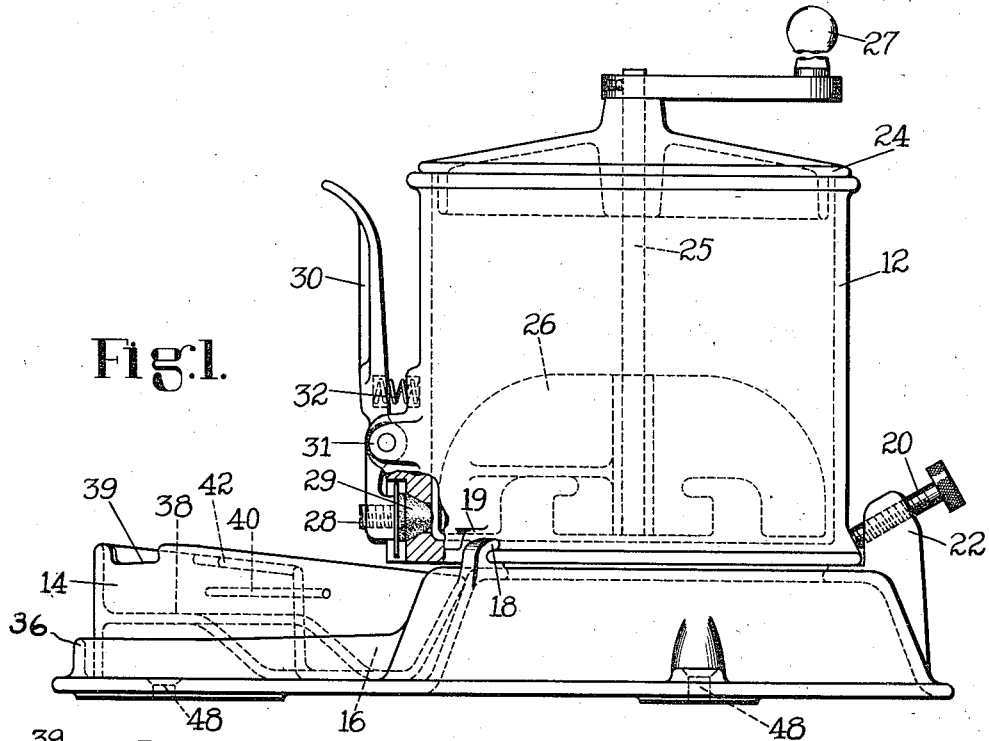
Figure 2:
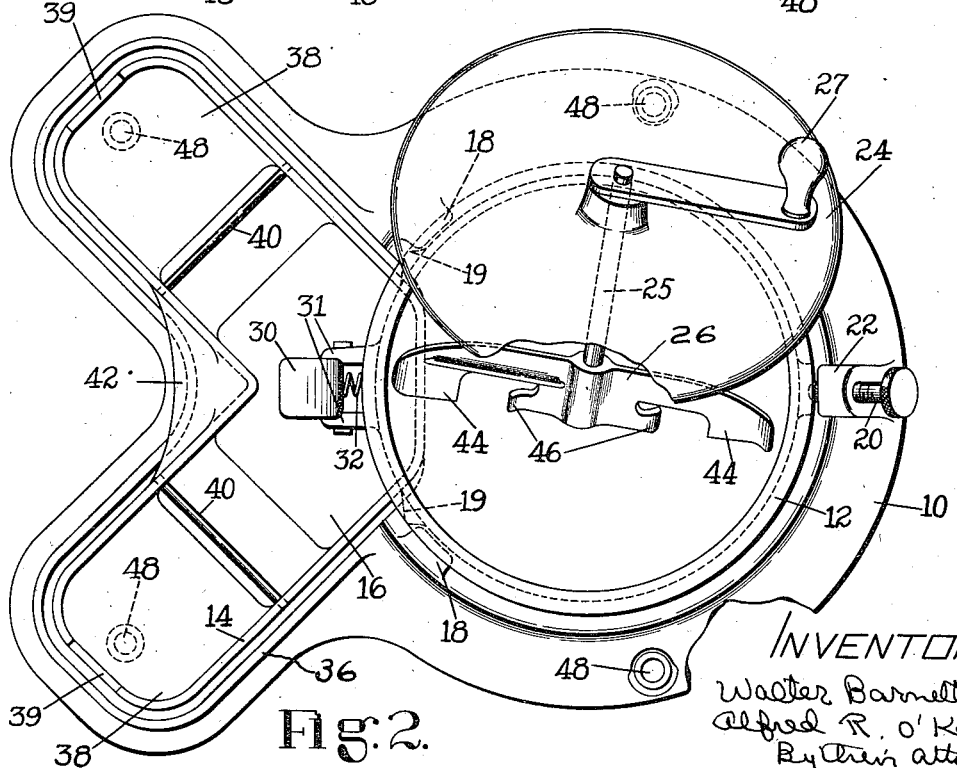

The invention provides an apparatus having a base supporting a container and a novel receiving tray which is readily removable from the base, this tray serving for the reception of the applying brushes used by at least two operators. Other features of the invention will be found in the mounting of the dispensing container upon the base, the construction and arrangement of a valve cooperating with the outlet opening of the container, as well as in the stirring device. These and other features of the invention are described in the following specification, taken in connection with the accompanying drawing, in which Fig. 1 shows the said apparatus in side elevation, partly in section, and Fig. 2 shows a plan view of the apparatus with a cover partially removed.

The apparatus shown consists of three main parts; namely, a base 10 which supports both a container 12 and a polygonal receiving tray 14. Both the container 12 and the tray 14 can be removed independently from the base. The tray 14, as shown best in Fig. 2, is L-shaped providing supports for two hand brushes which may be dipped as required into a sump 16 in the middle of the tray.

The container 12 is cylindrical, conveniently about six inches in height and internal diameter, and is held in position upon the base by having a rim at its bottom pressed against the inner sides of spaced lugs 18 upon the base by a screw 20 threaded through a lug 22. Small lugs 19 on the container project between the lugs 18 to cooperate with adjacent sides thereof and insure that the container is correctly positioned on the base and can not turn about its own axis. The container is provided with a cover 24 having mounted centrally a rod 25 carrying a stirring paddle 26 and a handle 27. As shown by Fig. 2 the cover with the paddle may be lifted from its operative position (shown in Fig. 1) when it is desired to refill the container or to drain the paddle and left, resting with substantially opposite points on the edge of the cover in contact with the upper edge of the container, with the rod 25 resting against the inside of the container.

The container also has an outlet valve specially constructed and arranged so as to avoid the presence of any ink or stain which is left unstirred. This outlet valve comprises a plunger having a stem 28 and a head 29 of rubber or like flexible material which is mounted in the lower end of a lever 30 pivoted between lugs 31 on the side of the container and maintained by a compression spring 32 normally closing a circular, inwardly tapering, outlet hole in the container. The making of the valve plunger stem and head in one piece of rubber or the like enables the stem to be screwed into a threaded hole in the lever as far as may be desired and also gives flexibility to the head allowing it to seat itself in the hole in the container. The head 29 of the plunger is arranged to pass into the outlet hole until its inner end is substantially flush with the inside surface of the container so that, so long as the valve is closed no pocket is left in which ink or stain can remain unstirred when the paddle is rotated manually from time to time as required.

Manual pressure against the upper end of the lever 30 will open the valve and allow some of the contents of the container to flow into the deep sump portion 16 of the tray 14 which is seated within and positioned by a surrounding rib 36 on the base 10. At either side of the sump 16 the tray 14 has two shallower portions or shelves 38 each of which is provided with a cross bar 40, conveniently of stout wire, against which hand brushes may be wiped to control the amount of stain or ink taken up. Each shallower portion 38 also has in its upstanding edge portion a notch 39 in which the handle of a brush may be rested while the bristle portion rests upon the cross bar 40.

The edge portion of the tray 14 extends around the sump portion 16 as well as the shallower portions 38 and, when the tray is in position on the base, extends under but clear of the container so that the tray may be lifted out from the base if so required without disturbing the container. A strengthening rib 42 extending across the interior angle of the L-shaped tray between the two shallower portions thereof provides a convenient means for lifting the tray. The paddle 26, as shown, conveniently has separated blade portions, the outer ones 44 of which have their leading edges so bent as to tend, when rotated clockwise as viewed in Fig. 2, to throw sediment in the ink or stain inwardly towards the center of the container. The inner blade 46 has its outer ends reversely bent so as to throw sediment outwardly. Rapid and thorough mixing is encouraged by this arrangement.

When the apparatus is to be put into use the base 10 is conveniently fixed to a work bench by screws passed through holes 48 and, the container having been filled and its contents stirred, a charge of ink or stain is allowed to flow into the tray sump whence it is lifted and applied to the work by hand brushes. The contents of the container can be restirred at any time without bringing its contents unduly into contact with the open atmosphere, also a fresh charge can be allowed to pass down into the tray whenever desired. The L-shaped tray shown is convenient for two workers but may be replaced by a tray having only a single shallow portion, cross bar and notch when so desired.

The container may be removed from the base after merely slackening off the screw 20 and replaced by another which may contain ink or stain of different color. When such change is made the tray will usually be changed also.

Having described our invention, what we claim as new and desire to secure by Letters Patent of the United States is:

1. In a dispensing apparatus, a tray to receive small quantities of material dispensed from a container, said tray having a portion forming a sump and a lateral portion provided with a rim which is notched, and with a brush-receiving shelf at a level higher than the bottom of the sump portion, and a cross-bar in the lateral portion above its shelf to cooperate with said notch to support a brush.

2. In a dispensing apparatus, a base, and a tray removably mounted upon said base to receive material from a supply container, said base having a tray locating rib, said tray being substantially L-shaped and provided with a transverse web at the angle of the L by which the tray may be lifted from the base.

3. In a dispensing apparatus, a base, a supply container removably mounted upon the base, a receiving tray removably mounted upon the base, and an outlet in said container above the tray, said tray being substantially L-shaped with a sump at the angle between the arms of the tray and a shallow portion at one side thereof, said base having a locating rib cooperating with the tray to locate the sump beneath the outlet.

4. In a dispensing apparatus, a base provided with a receiving tray, a container having an outlet above the tray, said container being removably mounted upon said base and provided with a bottom flange, overhanging lugs upon the base cooperating with said flange to hold the container upon the base, and locating lugs upon the container adjacent to said flange spaced to cooperate with adjacent sides of two of the lugs upon the base to position the container outlet with respect to the tray.

5. In a dispensing apparatus, a base provided with a receiving tray having a sump, a container having an outlet adjacent its lower end and removably mounted upon said base, said container being provided with a bottom flange, overhanging lugs upon the base cooperating with said flange to hold the container upon the base, and lugs upon the container to cooperate with a plurality of sides of the lugs upon the base, thereby to locate the container outlet over the sump of the tray and to prevent turning movement thereof with respect to the base.

6. In a dispensing apparatus, a base provided with means for securing in position thereon a supply container to hold the outlet of the container in predetermined position, and means upon said base for determining the location of a tray which is removable and has portions of different characteristics, so as thereby to bring the tray into a predetermined relation to the outlet of a container mounted on the base.

7. In a dispensing apparatus, a base for supporting a supply container having an outlet, a receiving tray having a sump adapted to be positioned beneath the outlet of the supply container and a shallow brush-supporting portion, and means on the base cooperating with the tray to determine the location of the sump with respect to the outlet.

8. In a dispensing apparatus, a receiving tray having a polygonal outline, said tray being provided with a sump and a shallow brush-supporting portion, and a base having means cooperating with the perimeter of the tray to determine the location of the tray upon the base so as thereby to bring the sump into a predetermined relation to the base.

ALFRED RICHARD O'KEY.
WALTER BARNETT.